United States Patent [19]
Koutsky et al.

[11] 4,241,893
[45] Dec. 30, 1980

[54] ADJUSTABLE SEAT ASSEMBLY

[75] Inventors: Louis J. Koutsky, Milan; Alexander M. Breitmeyer, Taylor Ridge, both of Ill.

[73] Assignee: Sears Manufacturing Co., Davenport, Iowa

[21] Appl. No.: 38,317

[22] Filed: May 11, 1979

[51] Int. Cl.³ .............................................. F16M 13/00
[52] U.S. Cl. ................................. 248/425; 296/65 R; 297/93
[58] Field of Search ............... 248/425, 429, 430, 419, 248/407, 415, 416, 418; 296/65 R; 297/93, 94, 344

[56] References Cited

U.S. PATENT DOCUMENTS

| | | | |
|---|---|---|---|
| 2,290,464 | 7/1942 | Buchheit | 296/65 R UX |
| 2,409,114 | 10/1946 | Elleman et al. | 248/417 UX |
| 3,300,172 | 1/1967 | Noller et al. | 248/425 |
| 3,412,968 | 11/1968 | Rose et al. | 248/425 |
| 3,437,373 | 4/1969 | Boston | 296/65 R |
| 3,448,820 | 6/1969 | Aiello et al. | 296/65 R X |
| 3,542,424 | 11/1970 | Bingley | 296/65 R X |
| 3,747,723 | 7/1973 | Peterson | 296/65 R X |
| 3,964,713 | 6/1976 | Joslyn | 296/65 R X |
| 4,014,507 | 3/1977 | Swenson | 248/425 X |
| 4,026,379 | 5/1977 | Dunn | 296/65 R |

*Primary Examiner*—J. Franklin Foss
*Attorney, Agent, or Firm*—Cushman, Darby & Cushman

[57] ABSTRACT

An adjustable seat assembly particularly adapted for a mobile vehicle which permits the seat to be moved fore-and-aft, laterally side-to-side, vertically and rotationally. A latch is provided for selectively preventing and permitting rotation of the seat and other portions of the seat assembly relative to a fixed pedestal. A projection is mounted to the bottom of the seat at a predetermined aft position and predetermined lateral position. Guide means such as a rigid barrier is positioned to abut the latch release projection and slidably guide the seat toward the predetermined lateral position as the seat moves toward the predetermined aft position, thereby directing the release projection to the latch and permitting the seat to be released for rotation by pushing the seat aft from any lateral or longitudinal position.

19 Claims, 6 Drawing Figures

ADJUSTABLE SEAT ASSEMBLY

BACKGROUND OF THE INVENTION

The invention relates to vehicle seat support assemblies and more particularly to such an assembly which may be rotated and slidably adjusted fore-and-aft, sideways, and vertically.

Backhoe tractors and the like require the operator's attention at both the front and the back of the tractor. In such vehicles, the operator's seat may be surrounded both fore-and-aft in relatively close relationship by obstructions such as controls and the like which make it difficult for the operator to get into and out of the seat since these obstructions limit free movement of the operator's legs. In order to accommodate or overcome these problems it is well known to install in such vehicles seats which may be adjusted vertically and fore-and-aft and may be rotated when in an aft position. For example, U.S. Pat. No. 4,014,507 issued to Swenson, and U.S. Pat. No. 2,409,114 issued to Elleman et al, show seat support assemblies which may be adjusted vertically and fore-and-aft and include a latch which may be disengaged to permit rotation of the seat when the seat is in an aft position. These seat assemblies are normally locked against rotation by the latch in all forward positions. This feature permits the seat to be unlatched for rotation only when the seat is aft where the obstructions in the cab will not interfere with the free rotation of the operator's legs. The seat of such a vehicle is normally centered laterally for the best viewing by the operator of both sides of the tractor when facing either the backhoe or the front of the tractor. Centering of the seat also maximizes leg space when the seat is being rotated.

Another problem with the use of a backhoe tractor and the like is that the backhoe or other operational device aft of the tractor cab may interfere with the operator's view of work being done behind the operational device. This problem can be alleviated by providing the seat assembly with means for adjusting the seat in a lateral side-to-side direction so that the operator may move to the left or right of the device which otherwise blocks his view. However, while seats which are adjustable in both lateral side-to-side and fore-and-aft directions are known, such seats are not practical for use in backhoe tractors and the like since they do not include means for rotating the seat when in a predetermined position, e.g. aft, at the midpoint of side-to-side movement, or means for locking the seat against rotation at other positions.

SUMMARY OF THE INVENTION

The present invention provides an improved means for supporting a vehicle seat which permits the seat to be moved fore-and-aft, laterally side-to-side, vertically and rotationally. In accordance with the present invention there is provided an adjustable seat assembly which includes a seat, a pedestal vertically supporting the seat from below and adjustment means for slidably adjusting the seat in fore-and-aft and lateral side-to-side directions relative to the pedestal axis. The adjustment means, which includes a side-to-side movable carriage, and a forwardly and rearwardly movable support frame, carries the seat and is mounted for rotation to the pedestal by a base support frame. A latch operatively connected between the base support frame and the pedestal is provided for selectively preventing and permitting rotation of the adjustment means relative to the pedestal. A latch release means projects from the seat so as to engage the latch upon arrival of the seat at a predetermined aft position and predetermined (preferably centrally located) lateral position. When the projection engages the latch, the latch is caused to disengage the pedestal thus permitting rotation of the seat. Guide means such as a rigid barrier is mounted to the base support frame so as to abut the latch release projection and slidably guide the seat toward the predetermined lateral position as the seat moves toward the predetermined aft position, thereby directing the projection to the latch.

In operation, the operator while seated may use his feet to urge the seat aft from any lateral position until the latch release projection abuts the guide barrier and guides the seat to the predetermined lateral position. By continuing to push the seat rearward the release projection engages and releases the latch so that the seat may be rotated relative to the pedestal. Preferably, the pedestal may be engaged at at least two opposite locations thereon, so that the seat may be fixed against rotation while facing in either of two directions (i.e., the front and back of the tractor).

The seat support assembly of the present invention also provides improved means for vertically adjusting the seat included in a spring loaded vertical support structure of the pedestal.

BRIEF DESCRIPTION OF THE DRAWINGS

These and other features, and advantages of the invention will best be understood from the following description of the preferred embodiment of the invention when read in connection with the accompanying drawings in which.

DETAILED DESCRIPTION OF THE PREFERRED EMBODIMENT

Figure 1:
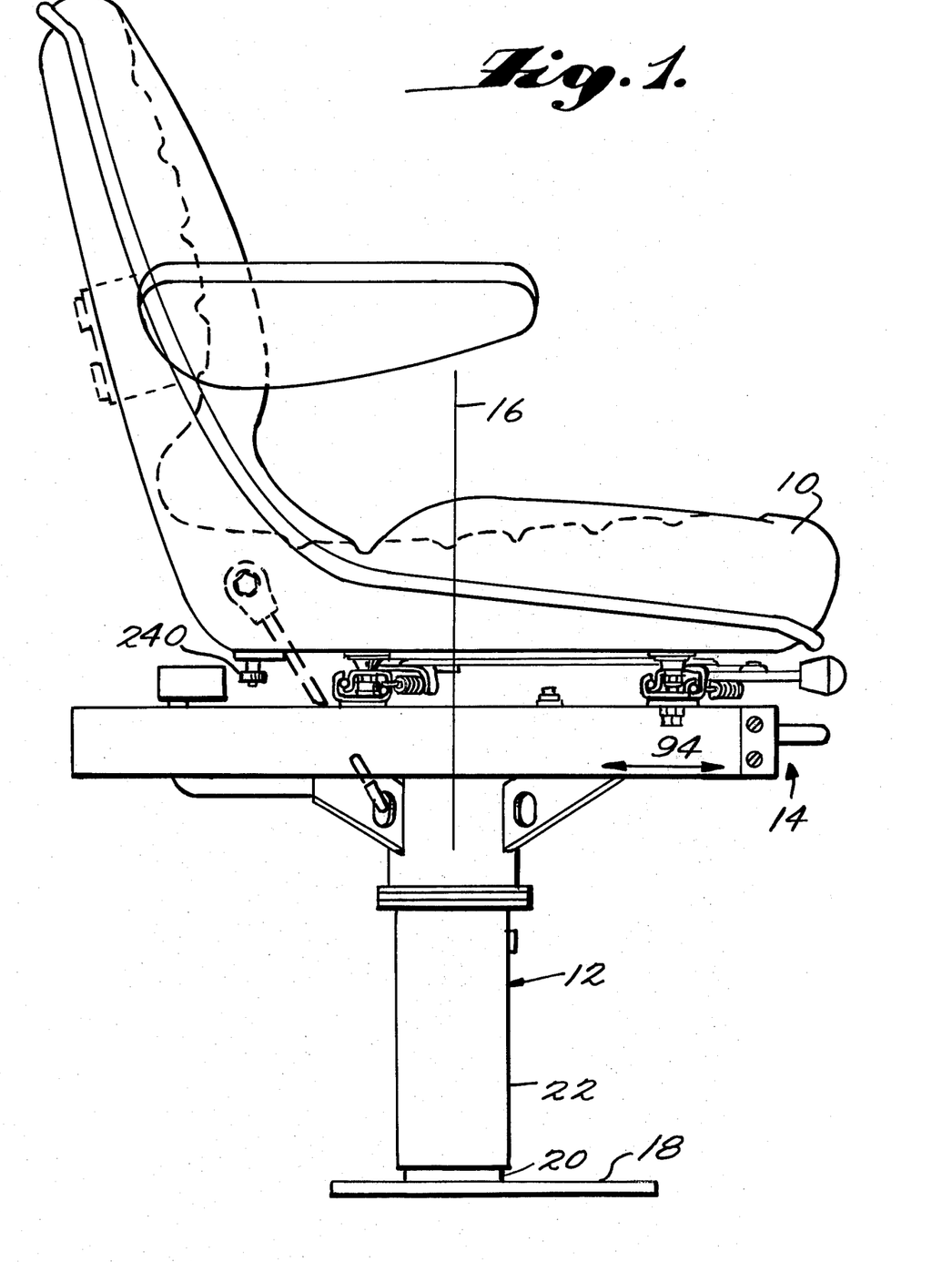
FIG. 1 is a side elevation of the adjustable assembly of the preferred embodiment of the present invention.

Referring first to FIG. 1, there is shown an adjustable seat assembly in accordance with the present invention. A seat 10 is supported from below by pedestal assembly 12. An adjustment assembly generally identified by the numeral 14 is mounted to the pedestal assembly 12 for rotation relative thereto in the horizontal plane and rigidly carries seat 10. Adjustment assembly 14 cooperates with pedestal assembly 12 and seat 10 to permit slidable adjustment of the seat in fore-and-aft and lateral side-to-side directions relative to the pedestal axis 16 as will be described. The pedestal assembly 12 includes means for adjusting the vertical height of the seat as will also be described.

Figure 2:
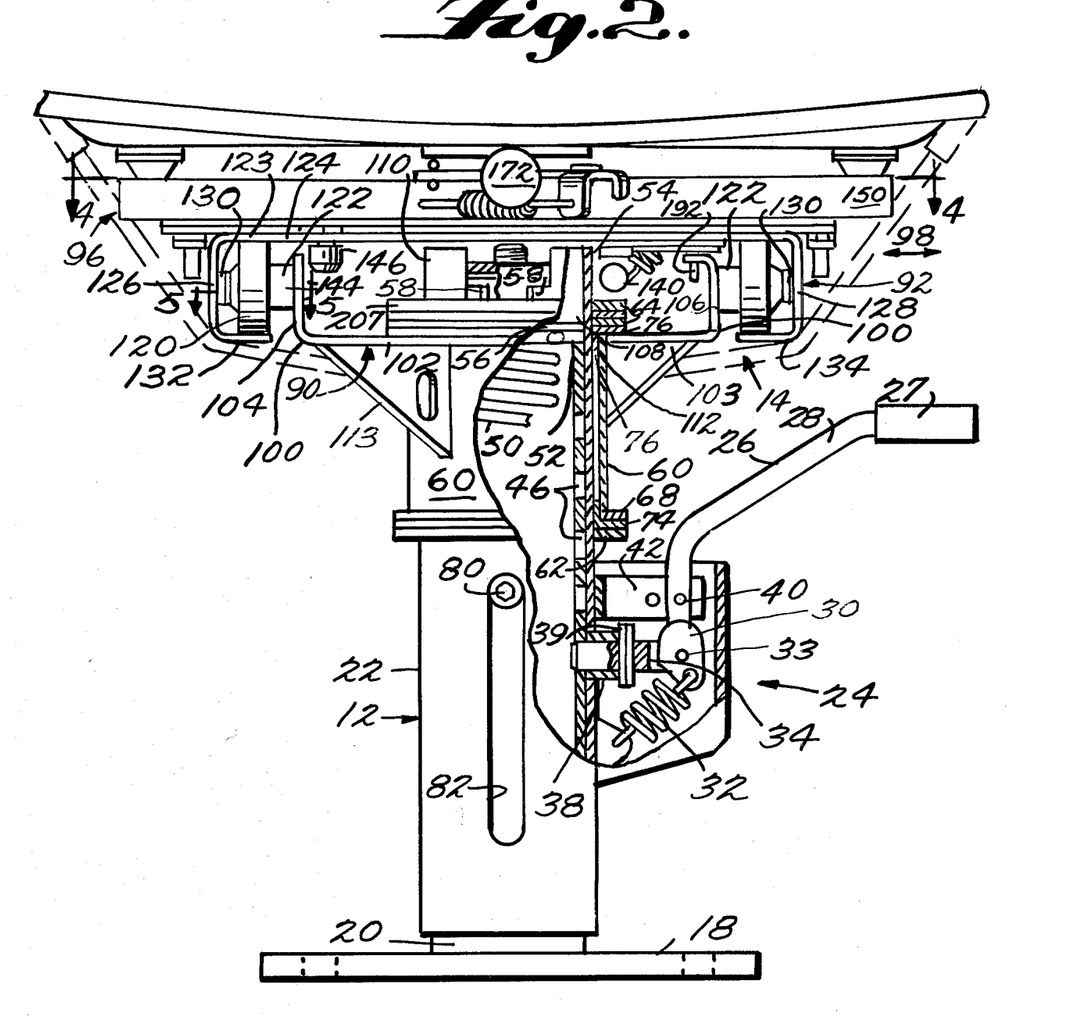
FIG. 2 is a front elevation of supporting portions of the seat assembly shown in FIG. 1 with parts broken away for clarity.

Referring now to FIG. 2, pedestal assembly 12 includes a base plate 18 which may be bolted or otherwise securely mounted to the floor of a vehicle and is rigidly connected to an inner support tubular member 20 which extends vertically upwardly therefrom. An outer tubular member 22 which supports adjustment assembly 14 in its upper end, surrounds tubular member 20 in vertical sliding relationship therewith. A height adjustment latch assembly 24 is mounted to the outside surface of tubular member 22. Height adjustment assembly 24 includes a lever 26 having a horizontal handle portion 27, an arm portion 28 and a vertical actuation portion 30. Above its lower end, the lever 26 is pivotally connected by horizontal pivot pin 40 between the ears of U-shaped bracket 42 having its base welded or otherwise suitably secured to the exterior of the outer tube 22. The lower end of the lever is pivotally connected by a horizontal pivot pin 33 to the outer end of a latch pin 34 slidably mounted to a tubular boss 38 on the outer tube 22. The inner end of latch pin 34 is selectively engageable in one of a plurality of vertically aligned holes 46 in the inner tube 20 to lock the outer tube 22 in any one of a number of vertical positions relative to the inner tube 20 in order to adjust the height of the seat 10. Preferably, a coil tension spring 32 is connected between the lower end of lever actuation portion 30 and an ear secured to the exterior of the tube 22 to maintain the pin 34 in its latched position. A stop pin 39 extending transversely through the latch pin, is adapted to abut the outer end of boss 38 to limit inner movement of the latch pin 34. A coil compression spring 50, interposed between spring retainer assembly 52 disposed at the upper end 54 of outer tube 22 and the base plate 18, for urging the assembly 14, together with the seat 10, upwardly when the latch pin 34 is released to thereby upwardly adjust the assembly 14. A downward adjustment of the assembly 14 can be accomplished by the weight of a person sitting on the seat 10, while the latch pin 34 is released. Spring retainer assembly 52 includes a circular plate 56, which abuts spring 50. Circular plate 56 is retained inside top end 54 of outer tube 22 by tabs 58. Tabs 58 depend radially inward from the wall of the upper end 54 of tube 22.

The horizontal adjustment assembly 14 is rotatably mounted to the top of pedestal assembly 12 by a rotatable sleeve 60 which is received around the outside of outer tube member 22 between a pair of flanges 62 and 64 which are mounted in spaced relationship around tube member 22 near the top thereof, flange 62 being welded to outer member 22. Rotatable sleeve 60 has an outwardly extending peripheral lip 68 at its lower end and is butt-welded at its top edge 70 to adjustment assembly 14 as will be described. A pair of circular L-shaped swivel bearings 74 and 76 are respectively mounted between lip 68 and flange 62, and flange 64 and top edge 70 of sleeve 60 in order to provide a smooth surface for the rotation of rotatable sleeve 60. Lateral projection 80 from inner tube member 20 extend through vertical slot 82 in outer tube member 22 to prevent relative rotation between the tubes 20 and 22 when the latch pin 34 is released and also limit relative vertical movement between the two tubes.

In accordance with the preferred embodiment of the present invention, adjustment assembly 14 includes a base platform 90 rigidly fixed to the top edge 70 of rotation sleeve 60, a support platform 92 slidably mounted to base platform 90 for movement in fore-and-aft directions indicated by the arrow 94 shown in FIG. 1, and a carriage 96 rigidly secured to seat 10 and slidably mounted to support platform 92 for movement in lateral side-to-side directions shown by arrow 98 in FIG. 2. Base support platform 90 includes a generally U-shaped channel member 100 whose horizontal base portion 102 is substantially wider than its sidewalls 104 and 106. Base portion 102 has a circular hole 108 near the center thereof through which passes the top end 54 of tube member 22. The edges 112 of hole 108 are butt-welded to the top edge of rotation sleeve 60. Four support arms 113 radiated outwardly and upward from sleeve 60 to base portion 102 in order to improve stability.

Figure 5:
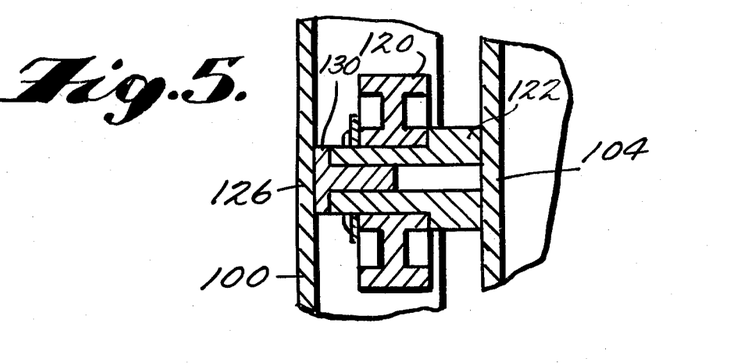
FIG. 5 is an enlarged sectional plan view of a fore-aft slide track of the present invention taken along line 5—5 in FIG. 2.

Referring to FIGS. 2 and 5, four rollers 120, having axles 122 fixedly mounted to the outside surfaces of U-channel side portions 104 and 106 at opposite ends thereof, provide horizontal slidable support for platform frame 92 as will be described. Support platform frame 92 includes an inverted U-shaped channel member 123 having a base portion 124 which is substantially wider than its depending sidewalls 126 and 128. Base portion 124 extends across and is supported by rollers 120. The inside surfaces of sidewalls 126 and 128 abut slide bearings 130 which are mounted to the outer ends of roller axles 122. In this manner, U-channel sidewalls 126 and 128 and slide bearings 130 provide side support and alignment for fore-and-aft movement of seat 10 with respect to the base support frame 90. FIG. 5 illustrates the rollers 120 and their cooperation with the respective sidewalls 104 and 126 of U-channels 100 and 122. U-channel sidewalls 126 and 128 also have inwardly extending lips 132 and 134 which extend below rollers 22 in spaced relation therewith in order to provide stability against rocking of the carriage and seat with respect to the base support frame 90.

Referring to FIG. 2, a fore-aft adjustment latch assembly 140 is pivotally mounted to the base portion 124 of U-channel 123 so that the seat may be releasably locked against fore-and-aft movement as will be described. A short L-shaped bracket 144 is welded to the inside top surface of base support U-channel sidewall 104 in order to limit the fore-and-aft movement of seat 10 and support frame 92 between two stops 146 and 148 which project downward from support frame base 124. Mounted to the top surface of support base 124 are a pair of laterally directed lower slide tracks 150 and 151 which cooperate with upper slide members which are rigidly mounted to seat 10, as will be described, in order to permit lateral side-to-side movement of seat 10.

Figure 3:
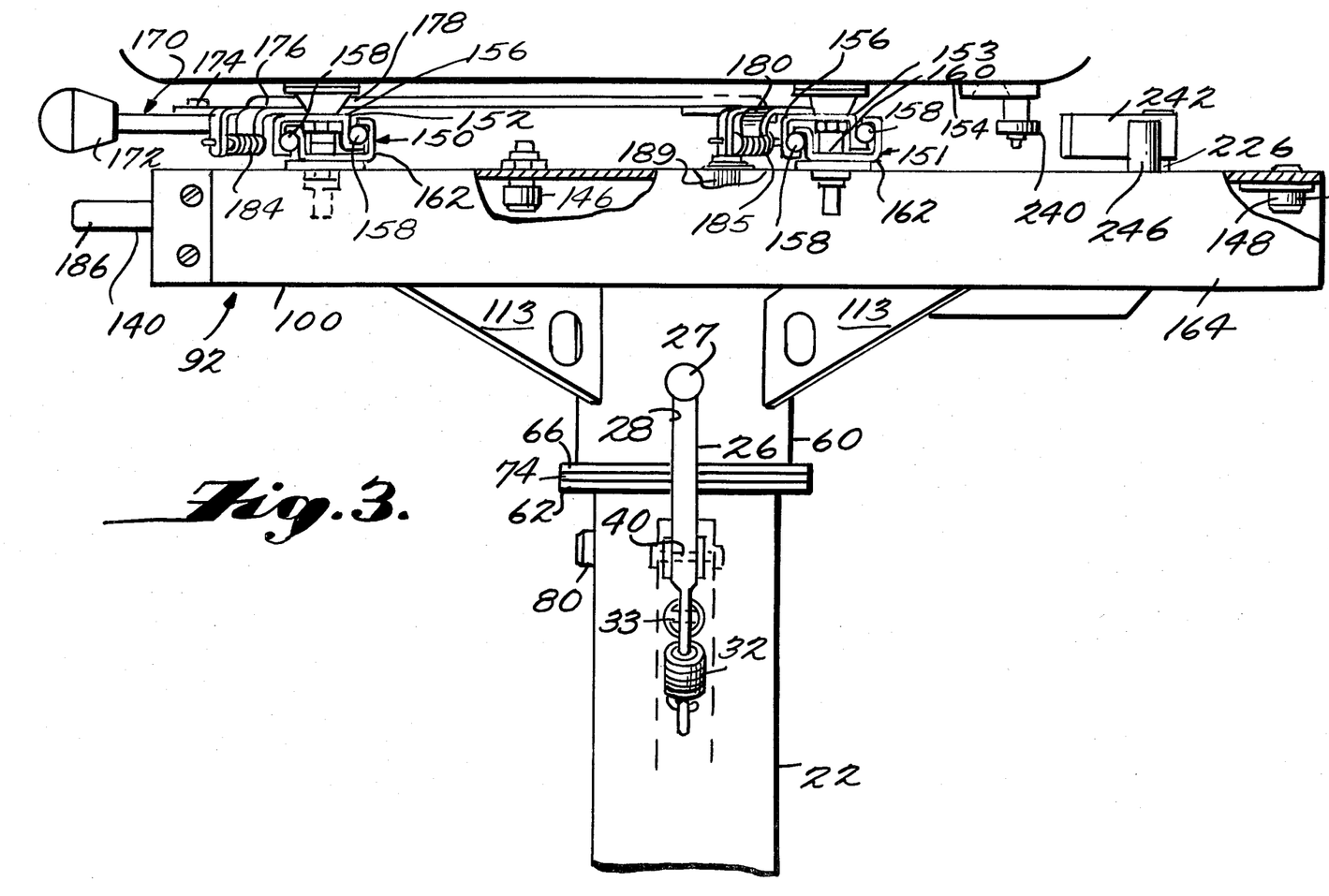
FIG. 3 is a side elevation of the supporting portions of the seat of the present invention taken from the other side than that shown in FIG. 1.

Referring now to FIG. 3, seat 10 is mounted at its bottom surface 154 to a carriage 156 which consists of a pair of elongated slide members 152 and 153 adapted to cooperate with lateral slide tracks 150 and 151 in order to permit lateral movement of the seat 10 relative to support frame 92 to which the slide tracks 150 and 151 are mounted. A latch assembly 170 is mounted to slide members 152 and 153 and operates in a conventional manner to adjustably fix the relative positions of the slide tracks and slide members. Any suitable conventional adjustable seat slide and latch assembly may be utilized. For example, the slide and latch assembly unit number 80908 manufactured by Atwood Mobile Products Company may be used. In accordance with the preferred embodiment the tracks 150 and 151, which each include a plurality of ball bearings 158 and rollers 160 and a double lipped U-channel 162, form together with carriage members 152 and 153 a conventional slide assembly. Latch assembly 170 includes a pivot handle 172 which pivots about pivot point 174 of latch body 176 to cause latch body 176 to disengage studs (not shown) in track 150. Latch body 176 is connected by an aft extending rod 178 to an identical latch body 180 such that when handle 172 is pivoted latch body 180 will also operate in an identical manner to release the studs in the lateral slide track 151 so that slide members 152 and 153 may respectively slide laterally along slide tracks 150 and 151. Coil tension springs 184 and 185, respectively mounted between latch body 176 and slide member 152 and latch body 180 and slide member 153, maintain the latches in normally locked positions.

Figure 4:
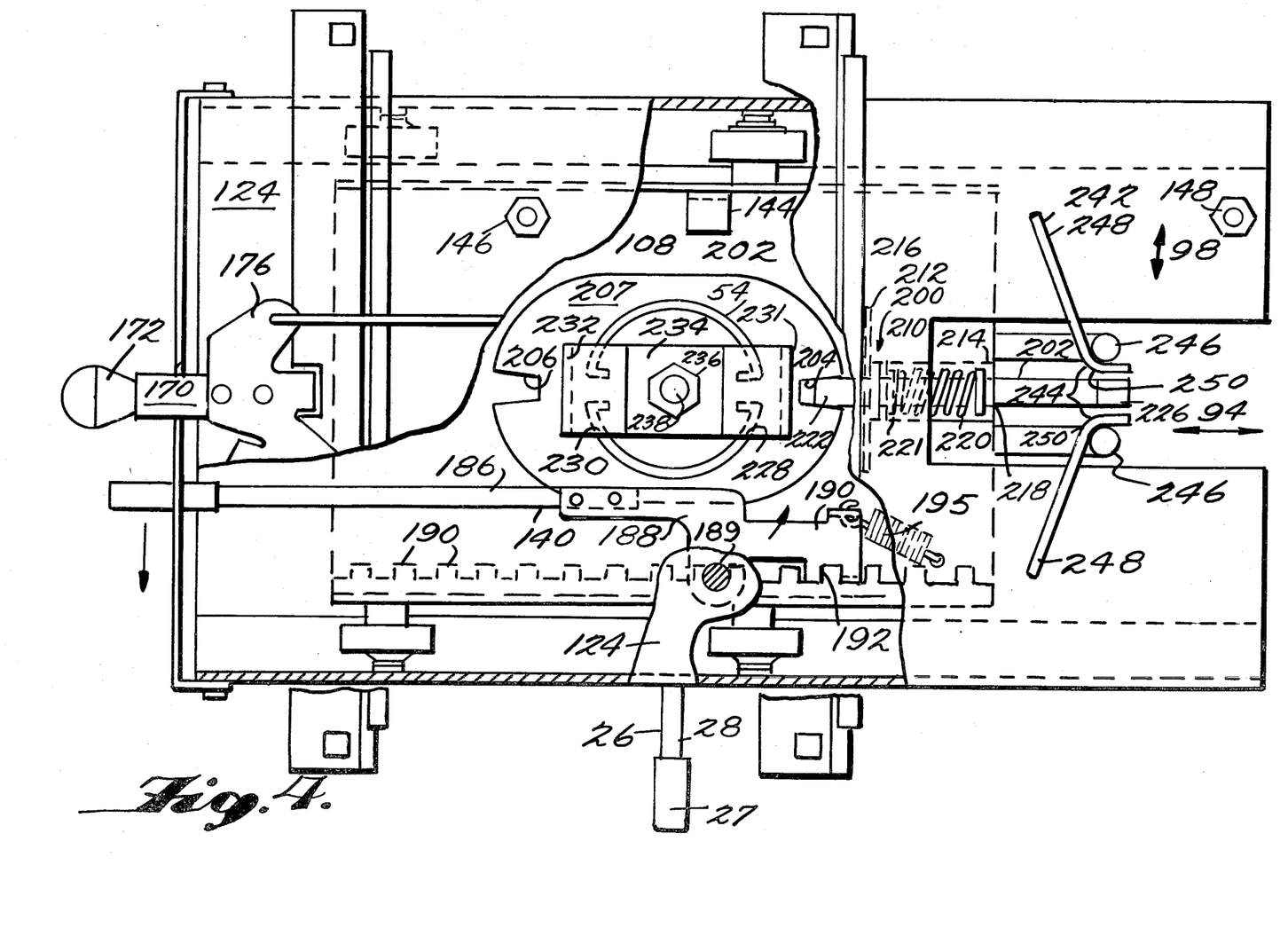
FIG. 4 is a sectional plan view of the seat assembly shown in FIG. 1 taken along the line 4—4 in FIG. 2 with parts broken away for clarity.

Referring now to FIG. 4, the operation of fore-and-aft adjustment latch assembly 140 is seen. Fore-and-aft adjustment latch assembly 140 includes an elongated latch handle 186 which extends from the fore-end of the adjustable seat assembly aft to a latch body 188 to which it is suitably rigidly fastened. Latch body 188 is pivotally mounted above to base 124 by pin 189 as is best illustrated in FIG. 3. An aft extending portion 190 of latch body 188 has a notch 192 in the outer edge thereof which is normally held in engagement with one of a row of teeth 194, which extend inwardly from the top of base sidewall 104, by a coil tension spring 195 connected between latch aft portion 190 and support frame base 124. By pivoting handle 186 about axle 189 notch 192 disengages teeth 194 to permit sliding fore-aft movement of support frame 92 and seat 10.

Also provided in the adjustable seat assembly of the present invention is latch means for selectively preventing rotation of the seat 10 and adjustment assembly 14 in relation to the pedestal assembly 12, means for releasing the latch means upon arrival of the seat at a predetermined aft position and predetermined lateral position and guide means for guiding the seat 10 toward the predetermined lateral position when the seat 10 is moved from any initial lateral and longitudinal position toward the predetermined aft position. In accordance with these features, and referring to FIGS. 4 and 6, there is provided a latch assembly 200, operably mounted between base support frame 90 and the top end 54 of pedestal outer tubular member 22, which releasably locks the seat 10 and adjustment assembly 14 against rotation. Latch assembly 200 includes an elongated latch rod 202 which is aligned in the fore-aft direction 94 and is spring mounted and slidably supported for insertion into fore-aft aligned horizontal slot-like openings 204 and 206 in a horizontal latch plate 207 which is welded to the top end 54 of pedestal outer tubular member 22 above flanges 64. Latch plate 207 is further secured to tube member 22 by a bracket 229 which extends substantially horizontally inside wide vertical slots 228 and 230 at the top of outer pedestal tube upper end 54. Bracket 229 has downwardly directed lateral side edges 231 and 232 which are welded to plate 207 between slots 204 and 206 and upper tube openings 228 and 230. The base portion 234 of bracket 229 is supported in spaced relation with circular plate 56 and is adjustably fastened thereto by a nut 236, and a bolt 238 which is welded to the top of plate 56. By tightening nut 236 on bolt 238, bracket 229 eliminates any play from swivel bearings 74 and 76. Latch rod 202 includes an upwardly extending vertical release tab 226 at its aft end. Latch rod 202 is slidably supported by a pair of spaced apart vertical plates 212 and 214 mounted to the base support 92 aft of pedestal opening 204. Plates 212 and 214 have holes 216 and 218 for slidably and horizontally receiving rod 202. A coil compression spring 220 is mounted to the middle portion of rod 202 between a vertical pin 221 extending from rod 202 and plate 218 so as to urge the front tip 222 of rod 202 into one of the openings 204 and 206 when it is aligned therewith.

Figure 6:
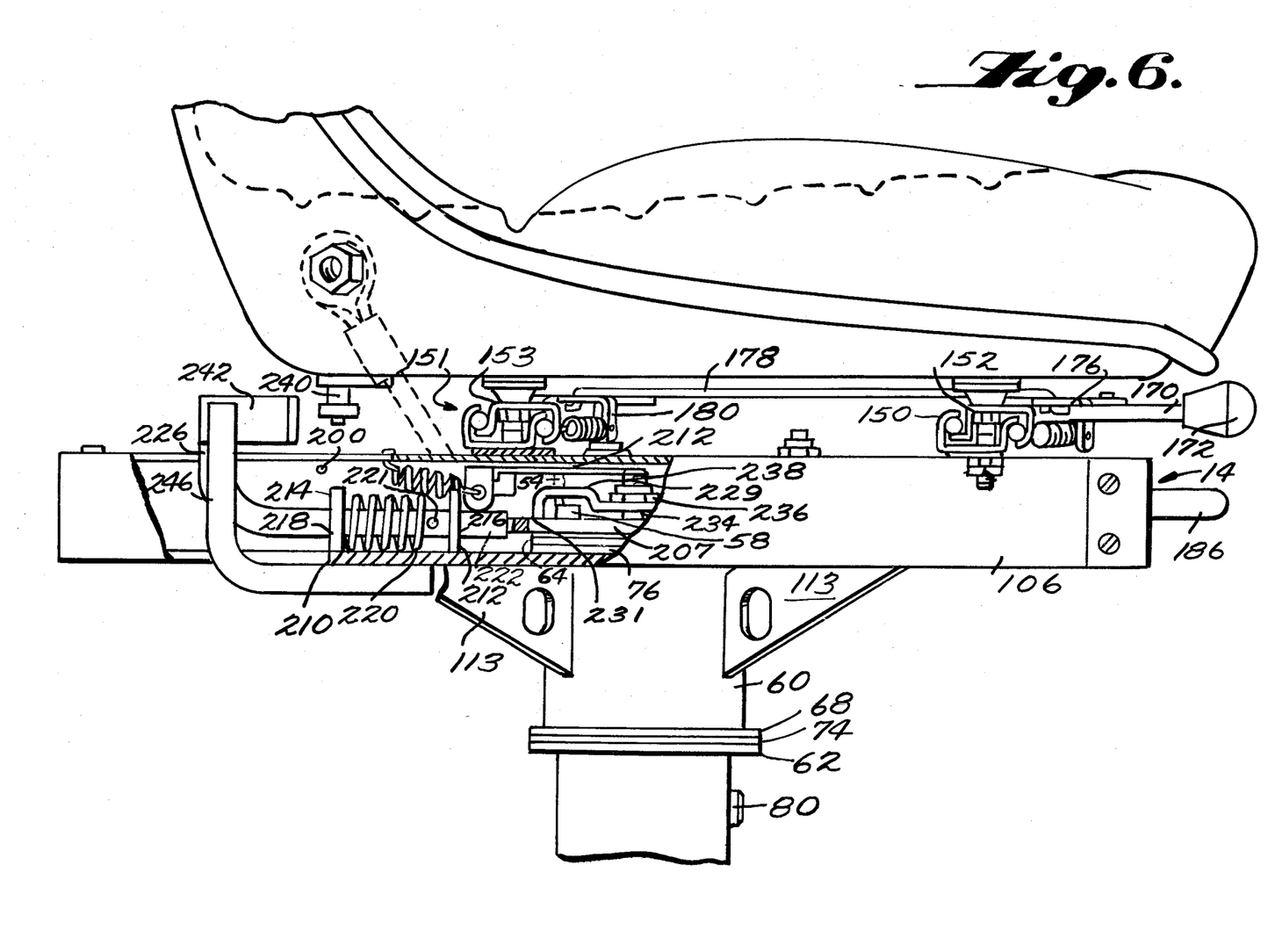
FIG. 6 is an enlarged side elevation similar to FIG. 1 showing the support portions of the seat assembly with parts broken away for clarity.

Latch release means are provided by a protrusion 240 rigidly mounted to the seat 10, centrally located along the bottom rear edge thereof so that when seat 10 is centered laterally with respect to support frame 92, protrusion 240 is aligned with tab 226 in fore-and-aft direction 94. As a result, when seat 10 is laterally centered and is moved in an aft direction, protrusion 240 will engage tab 226 and the latch rod 202 will be pushed aftward to move out of hole 206 and thereby disengage from pedestal tube 22 and permit free rotation of the adjustment assembly 14 and seat 10.

In order to guide seat 10 to a laterally central position so that protrusion 240 may engage release tab 226, a V or wing-shaped guide barrier 242 is provided. Guide barrier 242 is in the same horizontal plane as tab 226 and includes an opening at its apex 244. The apex opening 244 is laterally aligned with rod 202 such that latch rod release tab 226 is disposed within or directly behind that opening. Barrier 242 may be mounted to base frame 90 by a pair of L-shaped rods 246 welded horizontally to the bottom surface of base support 102 and extending vertically adjacent to tab 226. Guide 242 may be formed of separate flat bent guide rods 248 welded at their bends 250 to the vertical portion 252 of support rods 246. Rods 248 form a barrier which extends as the two halves of a V rearward and inward from its outer edges toward support rods 246 and then aftward between rods 246 to form a short channel for directing protrusion 240 into firm contact with release tab 226.

It will be observed that in the preferred embodiment, a single element (protrusion 240) is utilized both to guide the seat to the predetermined lateral and aft position where the latch may be released and to engage the latch to cause it to be disconnected from the pedestal and permit rotational movement of the seat. However, it should also be noted that it is fully contemplated in accordance with the present invention that the latch release means and the guide means may be completely separate.

Although only a preferred embodiment of the invention is disclosed in detail above, for illustrative purposes, it will be understood that variations and modifications of the disclosure which lie within the scope of the appended claims are fully contemplated. For example, it will be understood that the fore-and-aft and side-to-side slide assemblies and their corresponding latch and handle assemblies which have been described in detail above are illustrative only and may be replaced by any other suitable means for longitudinally and tranversely adjusting the seat.

What is claimed is:

1. In an adjustable seat assembly:
   a seat;
   a pedestal having a vertical axis for vertically supporting the seat from below;
   adjustment means cooperating with said pedestal and with said seat for slidably adjusting said seat in fore-and-aft and lateral side-to-side directions relative to the pedestal axis, said adjustment means carrying said seat and being mounted to said pedestal for rotation relative thereto in a horizontal plane;

latch means for selectively preventing and permitting rotation of said adjustment means relative to said pedestal;

latch release means, responsive to the arrival of said seat at a predetermined aft position and predetermined lateral position, for releasing said latch means; and guide means for guiding said seat toward said predetermined lateral position as said seat moves toward said predetermined aft position.

2. An adjustable seat assembly as in claim 1 wherein said adjustment means includes:

a first support frame rotatably supported by said pedestal, and a second support frame slidably mounted to said first support frame for horizontal longitudinal movement with respect thereto;

said seat being slidably mounted to said second support frame for horizontal transverse movement with respect to said first and second frames;

said latch means being operatively connected between said pedestal and said first support means for selectively preventing and permitting rotational movement of said first support frame with respect to said pedestal;

said latch release means being mounted to said seat and engaging said latch means upon arrival of said seat at said predetermined aft and lateral positions.

3. An adjustable seat assembly as in claim 2 wherein said guide means is fixedly mounted to said first support frame.

4. An adjustable seat assembly as in claim 1 wherein said latch means is operatively connected between said pedestal and said adjustment means, said guide means including a guide barrier fixedly mounted to said adjustment means and a first member extending from said seat such that said guide barrier abuts said first member when said seat moves toward said predetermined aft position to slidably guide said seat to said predetermined lateral position.

5. An adjustable seat assembly as in claim 4 wherein said adjustment includes:

a first support frame rotatably supported by said pedestal, and a second support frame slidably mounted to said first support frame for horizontal longitudinal movement with respect thereto;

said seat being slidably mounted to said second support frame for horizontal transverse movement with respect to said first and second frames;

said latch means being operatively connected between said pedestal and said first support means for selectively preventing and permitting rotational movement of said first support frame with respect to said pedestal;

said latch release means being mounted to said seat and engaging said latch means upon arrival of said seat at said predetermined aft and lateral positions;

said latch release means engaging said latch means upon arrival of said seat at said predetermined aft and lateral positions;

said guide means being fixedly mounted to said first support frame.

6. A seat assembly as in claim 4 wherein said latch release means includes said first member, said first member engaging said latch means to disengage said latch means from said pedestal when said seat is moved to said predetermined aft position and said predetermined lateral position.

7. An adjustable seat assembly as in claim 6 wherein said latch means comprises a rod having a longitudinal axis extending fore-and-aft and having a fore end removably engaging said pedestal and an aft end turned upward, said rod being slidably mounted for movement along said longitudinal axis to said adjustment means, said rod being spring biased into engagement with said pedestal and fixed against movement in all directions perpendicular to said axis.

8. An adjustable seat assembly as in claim 7 further comprising means for limiting lateral side-to-side movement of said seat between left and right side boundaries and wherein said predetermined lateral position is halfway between said left and right side boundaries, said guide comprising a wing-shaped surface facing said pedestal axis, for abutting said first member, said guide having an opening at the apex of said wing-shaped surface for receiving said first member, when said seat is at said predetermined aft position and said predetermined lateral position, said rod aft end extending upward at said opening.

9. An adjustable seat assembly as in claim 1 wherein said adjustment means includes means for vertically adjusting the height of said seat relative to said pedestal.

10. An adjustable seat assembly as in claim 2 or claim 5, wherein said sliding means includes:

first slide track assembly means, slidably connecting said first support frame and said second support frame for longitudinally moving said second support frame and said seat between said fore-and-aft positions; and second slide track assembly means, slidably connecting said second support frame and said seat, for laterally moving said seat side-to-side.

11. An adjustable seat assembly as in claim 7 wherein said pedestal comprises means for receiving said rod in two separate angular positions to prevent rotational movement of said adjustment means with respect to said pedestal so that said seat may be fixed against rotation when facing either of two opposite horizontal directions.

12. An adjustable seat assembly for a mobile vehicle, said assembly comprising:

a seat;

a pedestal, having a vertical axis vertically securable to said vehicle;

means for horizontally sliding said seat between fore and aft boundaries, and between left and right boundaries, in relation to said pedestal axis said slide means including:

a first support frame rotatably supported by said shaft; and a second support frame slidably mounted to said first support frame for horizontal longitudinal movement with respect thereto;

said seat including a carriage mounted at the bottom thereof, said carriage being slidably mounted to said second support frame for horizontal lateral movement with respect to said first and second frames;

latch means operably connected between said shaft and said first support frame, for selectively preventing and permitting rotational movement of said first support frame with respect to said shaft;

release means, mounted to said seat, for disengaging said latch means from said shaft when said carriage is moved to a predetermined position along said aft boundary and between said left and right boundaries; and guide means, including a guide mounted to said first support frame, for guiding said seat to said predetermined position when said seat is moved toward said aft boundary.

13. A seat assembly as in claim 12 wherein:

said guide comprises a guide barrier mounted to said first support frame adjacent said aft boundary;

said guide means further including a first member fixed to and extending from said seat such that said guide barrier abuts said first member when said seat is moved toward said aft boundary to slidably guide said seat to said predetermined position.

14. A seat assembly as in claim 13 wherein said release means includes said first member, said first member engaging said latch means to disengage said latch means from said pedestal when said seat is moved to said predetermined position.

15. A seat assembly as in claim 14 wherein said latch means comprises:

a horizontally fore-and-aft extending rod having a longitudinal axis; said rod having a fore end removably engageable with said pedestal and an aft end turned upward;

said rod being slidably mounted for movement along said longitudinal axis to said first support frame;

said rod being spring biased into engagement with said pedestal and fixed against movement in all directions perpendicular to said axis; and said first member engaging said turned upward aft end of said rod to slide said rod aftward to disengage said pedestal when said seat is in said predetermined position.

16. A seat assembly as in claim 15 wherein said first position is halfway between said left and right side boundaries, said guide comprising a V-shaped surface facing said fore boundary along said longitudinal axis, for abutting said first member, said guide having an opening at the apex of said V-shape surface for receiving said first member, when said seat is at said first position, said rod aft end extending upward directly behind said opening.

17. A seat assembly as in claim 12 wherein said first support member includes means for vertically adjusting the height of said seat relative to said pedestal.

18. A seat assembly as in claim 12, wherein said sliding means includes:

first slide track assembly means, slidably connecting said first support frame and said second support frame for longitudinally moving said second support frame and said seat between said fore boundary and said aft boundary; and second slide track assembly means, slidably connecting said second support frame and seat, for laterally moving said seat between said left and right boundaries.

19. A seat assembly as in claim 15 wherein said pedestal includes means for receiving said rod in two separate angular positions to prevent rotational movement of said first support frame with respect to said pedestal so that said seat may be fixed against rotation when facing in either of two opposite horizontal directions.

* * * * *